UNITED STATES PATENT OFFICE.

JOHN H. FILBERT, OF BALTIMORE, MARYLAND.

MAKING FATTY FOOD COMPOUNDS.

995,777.

Specification of Letters Patent.  Patented June 20, 1911.

No Drawing.  Application filed March 23, 1911. Serial No. 616,544.

*To all whom it may concern:*

Be it known that I, JOHN H. FILBERT, a citizen of the United States, residing at Baltimore, in the State of Maryland, have invented certain new and useful Improvements in Making Fatty Food Compounds, of which the following is a specification.

This invention relates to a method of imparting to food compounds known as eleomargarin, butterin, etc., a flavor and odor like that found in butter made of cow's milk.

The objects of this invention are, first, to provide for imparting to the food compound a flavor and odor of natural butter without using either milk, cream or butter, as has been the common method heretofore; second, to provide for imparting to fatty food compounds the essential elements extracted from cow's milk, that yield the flavor and odor of butter, without however, any risk of also imparting thereto the disease germs or bacteria which cow's milk so often contains; third, to provide a fatty food compound that will have a flavor and odor like that of butter made of cow's milk and which will not contain casein, an element of natural milk; fourth, to provide a fatty food compound that will have a flavor and odor simulating that of butter made of cow's milk but without the cost and expense incident to employing cow's milk as heretofore done.

Heretofore manufacturers of food compounds known by the names of oleomargarin, butterin, artificial butter, etc., have included among the ingredients entering into such compounds, the following—oleo oil, neutral lard, sometimes cottonseed oil, sometimes natural butter or cream or as an equivalent therefor cow's milk, also salt and sometimes suitable coloring matter.

The following is an example of a formula for making a cheap grade of eleomargarin,—

Oleo oil ............ about 500 pounds.
Neutral lard ....... about 250 pounds.
Cottonseed oil ..... about 300 pounds.
Cow's milk ......... about 250 pounds.
Salt ............... about 100 pounds.
Coloring matter ... about 1 pound.

Total .......  1401 pounds.

The above quantities named in the formula would make about 1200 pounds of marketable eleomargarin. In making the higher grades of these fatty food compounds cotton-seed oil is often omitted, and in its place there is used a larger proportion of oleo oil.

The oil ingredients intended for the eleomargarin are usually warmed to a proper temperature to liquefy them so as to facilitate the mixing, and then are blended in a tank by the action of stirrer blades. The milk ingredient in the formula is used as the element to produce flavor and odor. When the milk, salt and coloring matter have been added to the said blended oil ingredients, the mixture is first churned to incorporate the last three named ingredients with the said oils and then the mixture is drawn off into a vat containing ice-water which chills and hardens it, and finally the mass is worked in a machine to remove the watery part which is usually treated as waste. The watery part thus removed by working constitutes about eighty per cent. of the original weight of the milk ingredient.

It will be seen from the foregoing that the solids of the milk which comprise fatty matter and casein remain in the eleomargarin.

The foregoing has reference to present methods of making eleomargarin.

A consideration of the composition of milk will at once suggest that the nitrogenous matter and fatty matter in milk are forms of solids of a too expensive character to make milk a desirable ingredient, from the manufacturers stand-point of cost, to be used as an addition to a low-priced food compound like eleomargarin, made up as it is almost entirely of fatty matter that costs only about one fourth as much per pound as the solids which the milk contributes to the said food compound.

Although milk is so comparatively expensive, its use in these food compounds has heretofore been deemed by the manufacturers as necessary in order that the compound should have the coveted flavor and odor derived from ripened or soured milk.

It is a well known fact that the milk of the cow very often contains disease germs or bacteria, and therefore the use of milk in oleomargarin is a cause for apprehension and makes such use objectionable; my present invention proposes a method by which the main advantages that milk affords to impart flavor and odor to oleomargarin and similar food compounds may be obtained without the objection or risk referred to.

I have discovered that the elements in the milk which furnish the desired flavor and odor, reside in what is known as "whey" which is that part of milk which remains fluid after the casein has coagulated and with the fatty matters separated and removed from the fluid. The flavoring elements referred to are albumin, milk-sugar or lactin, certain mineral salts in solution, and certain gases. "Whey" is the familiar water extracted in the process of cheese-making, and is also the water left from butter-milk after the casein therein has been coagulated and extracted by straining or filtration. Heretofore this fluid, "whey", has been regarded as possessing negligible virtues and as having little or no commercial value; and therefore this liquid has often been treated as a refuse or waste. I have also found by examination and experiment that the said flavor and odor elements in whey, or soured milk are not injured by a hot treatment to destroy the germ life or bacteria contained therein. In applying this hot treatment the whey or soured milk may be heated to a degree anywhere from 212 to 240 Fahrenheit.

My invention therefore consists of a method of making fatty food compounds, known as oleomargarin, butterin and the like, and of imparting to such compound a desirable flavor and odor by churning the said fatty compound with the fluid known as "whey" which has been freed of casein and germ life or bacteria. And my invention also consists of the finished product or article produced by said method.

The whey for the purpose of this method may be obtained from the cheese-maker or from the butter-maker, or may be produced by taking milk and "ripening" or souring it to develop a certain degree of acidity and flavor and also to coagulate the casein to facilitate its separation from the fluid. As already stated the germ life or bacteria is to be destroyed by heating; if this heating is done before the casein has been removed from the whey the effect of the heat is to cook the casein so that the latter will precipitate to the bottom of a vessel, thus allowing the clear fluid whey to be decanted or drawn off; if desired the whey may be filtered. From this description it is to be understood that the sterilizing of the whey to destroy germ life may be done either before or after the casein has been removed from the whey.

In carrying out my method after the ingredients that comprise the fatty food compound have been thoroughly mixed or blended, I add to said fatty compound thoroughly sterilized whey in about the proportion of one part whey by weight to six or seven parts of the fatty compound, and at the same time add the salt and coloring matter, if coloring matter is to be used, and then churn the mixture. After the whey and salt (and coloring matter is used) have been thoroughly incorporated, the mixture in a semi-fluid condition is run off into a vat containing sterilized cold water which causes the mixture to harden and the mass is then taken out of the cold water and worked in a suitable machine to remove the watery part of the whey.

The fact that in producing the improved fatty compound of my invention, neither milk, cream or butter are used gives assurance that the finished article or product does not contain casein.

It is obvious that the number and character of the ingredients entering into the ordinary oleomargarin or butterin compounds permit of many variations of treatment and variations of proportions of the ingredients, and also permits of a large number of changes or substitutions of material all of which, however, are unimportant and immaterial so far as concerns the application of the inventive idea of the present invention.

Having thus described my invention what I claim and desire to secure by Letters Patent is,—

1. The method of imparting to fatty food compounds a flavor and odor consisting of taking a compound of oleo oil, neutral lard, cotton-seed oil and salt and churning therewith the fluid known as whey; then chilling the mixture to cause it to harden, and then working the hardened mass to remove the watery part of the whey.

2. The method of treating fatty food compounds comprising oleo oil, neutral lard and salt, consisting of churning with said compound the fluid known as whey; then chilling the mixture to cause it to harden, and then working the hardened mass to remove the watery part of the whey, whereby a desirable flavor and odor will be imparted to said compound.

3. The method of treating fatty food compounds comprising oleo oil, cotton-seed oil and salt, consisting of churning with said compound the fluid known as whey; the chilling the mixture to cause it to harden, and then working the hardened mass to remove the watery part of the whey, whereby a desirable flavor and odor will be imparted to said compound.

4. The method of treating fatty food compounds comprising oleo oil, neutral lard, cotton-seed oil and salt consisting of sterilizing the fluid known as whey to destroy germ life therein; churning said fatty food compounds and the sterilized whey to thoroughly incorporate them; then chilling the mixture to cause it to harden, and then working the hardened mass to remove the watery part of the whey.

5. An article of fatty food compound free from casein consisting of oleo oil, neutral lard, cotton-seed oil, salt, and the following elements extracted from milk, namely, albumin, milk-sugar, and soluble salts—said elements serving to impart flavor and odor to the compound.

In testimony whereof I affix my signature in presence of two witnesses.

JOHN H. FILBERT.

Witnesses:
G. FERD. VOGT,
CHARLES B. MANN, Jr.